US009306237B2

(12) United States Patent
Kwon et al.

(10) Patent No.: US 9,306,237 B2
(45) Date of Patent: *Apr. 5, 2016

(54) CABLE-TYPE SECONDARY BATTERY (71) Applicant: LG Chem, Ltd., Seoul (KR)

(72) Inventors: Yo-han Kwon, Daejeon (KR);
Sang-Wook Woo, Daejeon (KR);
Hye-Ran Jung, Daejeon (KR);
Je-Young Kim, Daejeon (KR); In-Chul Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,644

(22) Filed: Nov. 5, 2014

(65) Prior Publication Data

US 2015/0104685 A1 Apr. 16, 2015

Related U.S. Application Data (63) Continuation of application No. 14/188,795, filed on Feb. 25, 2014, now Pat. No. 8,945,752, which is a continuation of application No. PCT/KR2012/008397, filed on Oct. 15, 2012.

(30) Foreign Application Priority Data

Oct. 13, 2011 (KR) .................. 10-2011-0104873
Oct. 15, 2012 (KR) .................. 10-2012-0114104

(51) Int. Cl.
*H01M 10/02* (2006.01)
*H01M 10/04* (2006.01)
(Continued)

(52) U.S. Cl.
CPC ............ *H01M 10/0431* (2013.01); *H01M 4/13* (2013.01); *H01M 4/38* (2013.01);
(Continued)

(58) Field of Classification Search
None
See application file for complete search history.

(56) References Cited

U.S. PATENT DOCUMENTS 1,447,657 A 3/1923 Gouin et al.
3,839,090 A 10/1974 Morelock et al.
(Continued)

FOREIGN PATENT DOCUMENTS

CN 1388993 A 1/2003
CN 103348524 A 10/2013
(Continued)

OTHER PUBLICATIONS

International Search Report for Application No. PCT/KR2012/008403 dated Feb. 28, 2013.
(Continued)

*Primary Examiner* — Cynthia K Walls
(74) *Attorney, Agent, or Firm* — Lerner, David, Littenberg, Krumholz & Mentlik, LLP (57) ABSTRACT The present invention relates to a cable-type secondary battery having a horizontal cross section of a predetermined shape and extending longitudinally, comprising: a core for supplying lithium ions, which comprises an electrolyte; an inner electrode, comprising an open-structured inner current collector surrounding the outer surface of the core for supplying lithium ions, an inner electrode active material layer formed on the surface of the inner current collector, and an electrolyte-absorbing layer formed on the outer surface of the inner electrode active material layer; a separation layer surrounding the outer surface of the inner electrode to prevent a short circuit between electrodes; and an outer electrode surrounding the outer surface of the separation layer and comprising an outer electrode active material layer and an outer current collector.

31 Claims, 3 Drawing Sheets (51) Int. Cl.

| | |
|---|---|
| *H01M 4/66* | (2006.01) |
| *H01M 4/74* | (2006.01) |
| *H01M 4/75* | (2006.01) |
| *H01M 10/052* | (2010.01) |
| *H01M 10/0566* | (2010.01) |
| *H01M 10/058* | (2010.01) |
| *H01M 10/0525* | (2010.01) |
| *H01M 4/13* | (2010.01) |
| *H01M 10/0565* | (2010.01) |
| *H01M 4/38* | (2006.01) |
| *H01M 4/40* | (2006.01) |
| *H01M 4/42* | (2006.01) |
| *H01M 4/44* | (2006.01) |
| *H01M 4/46* | (2006.01) |
| *H01M 4/48* | (2010.01) |
| *H01M 4/485* | (2010.01) |
| *H01M 4/505* | (2010.01) |
| *H01M 4/525* | (2010.01) |
| *H01M 10/0564* | (2010.01) |
| *H01M 10/0569* | (2010.01) |
| *H01M 2/16* | (2006.01) |

(52) U.S. Cl.
CPC ............ *H01M 4/386* (2013.01); *H01M 4/387* (2013.01); *H01M 4/405* (2013.01); *H01M 4/42* (2013.01); *H01M 4/44* (2013.01); *H01M 4/466* (2013.01); *H01M 4/48* (2013.01); *H01M 4/485* (2013.01); *H01M 4/505* (2013.01); *H01M 4/525* (2013.01); *H01M 4/66* (2013.01); *H01M 4/661* (2013.01); *H01M 4/662* (2013.01); *H01M 4/668* (2013.01); *H01M 4/74* (2013.01); *H01M 4/75* (2013.01); *H01M 10/052* (2013.01); *H01M 10/058* (2013.01); *H01M 10/0525* (2013.01); *H01M 10/0564* (2013.01); *H01M 10/0565* (2013.01); *H01M 10/0566* (2013.01); *H01M 10/0569* (2013.01); *H01M 2/1653* (2013.01); *H01M 4/663* (2013.01); *H01M 2220/20* (2013.01); *H01M 2220/30* (2013.01); *H01M 2300/0017* (2013.01); *H01M 2300/0028* (2013.01); *H01M 2300/0082* (2013.01); *Y02E 60/122* (2013.01)

(56) References Cited

U.S. PATENT DOCUMENTS

| | | | |
|---|---|---|---|
| 3,897,266 | A | 7/1975 | Devitt et al. |
| 4,522,897 | A | 6/1985 | Walsh |
| 2001/0005561 | A1 | 6/2001 | Yamada et al. |
| 2002/0150820 | A1 | 10/2002 | Kanai et al. |
| 2002/0187401 | A1 | 12/2002 | Lee et al. |
| 2004/0062958 | A1 | 4/2004 | Facchi et al. |
| 2005/0271796 | A1 | 12/2005 | Neudecker et al. |
| 2007/0243456 | A1 | 10/2007 | Ahn et al. |
| 2009/0123832 | A1 | 5/2009 | Chigiri |
| 2010/0203372 | A1 | 8/2010 | Kim et al. |
| 2010/0304274 | A1 | 12/2010 | Bennett et al. |
| 2010/0323242 | A1 | 12/2010 | Choi et al. |
| 2011/0039156 | A1 | 2/2011 | Tu et al. |
| 2011/0117414 | A1 | 5/2011 | Choi et al. |
| 2011/0262809 | A1 | 10/2011 | Kumagai et al. |
| 2012/0009331 | A1 | 1/2012 | Kwon et al. |
| 2012/0015233 | A1 | 1/2012 | Kwon et al. |
| 2012/0040246 | A1 | 2/2012 | Sakai et al. |
| 2012/0156554 | A1 | 6/2012 | Kwon et al. |
| 2013/0149580 | A1 | 6/2013 | Kim |

FOREIGN PATENT DOCUMENTS

| | | | |
|---|---|---|---|
| EP | 2533328 | A2 | 12/2012 |
| EP | 2768059 | A1 | 8/2014 |
| GB | 150961 | A | 1/1922 |
| JP | H2-143779 | A | 12/1990 |
| JP | H08-213049 | A | 8/1996 |
| JP | 2009-007629 | A | 1/1997 |
| JP | H09-147845 | A | 6/1997 |
| JP | 2001-068150 | A | 3/2001 |
| JP | 2001110445 | A | 4/2001 |
| JP | 2002-237295 | A | 8/2002 |
| JP | 2005-011556 | A | 1/2005 |
| JP | 2008047398 | A | 2/2008 |
| JP | 2009-140904 | A | 6/2009 |
| JP | 2010-073421 | A | 4/2010 |
| JP | 2010129412 | A | 6/2010 |
| KR | 2003-0081499 | A | 10/2003 |
| KR | 20050030438 | A | 3/2005 |
| KR | 10-2005-0099903 | A | 10/2005 |
| KR | 20070009231 | A | 1/2007 |
| KR | 10-0742739 | B1 | 7/2007 |
| KR | 10-0804411 | B1 | 2/2008 |
| KR | 10-2009-0009598 | | 1/2009 |
| KR | 2010-0077692 | A | 7/2010 |
| KR | 20100127990 | A | 12/2010 |
| KR | 2011-0054557 | A | 5/2011 |
| KR | 20110054557 | A | 5/2011 |
| KR | 10-2011-0090768 | A | 8/2011 |
| KR | 2011-0089583 | A | 8/2011 |
| KR | 10-1072292 | B1 | 10/2011 |
| WO | 2010/032362 | A1 | 3/2010 |
| WO | 2010052950 | A1 | 5/2010 |
| WO | 2010/089991 | A1 | 8/2010 |
| WO | 2010/107229 | A2 | 9/2010 |
| WO | 2010107229 | A2 | 9/2010 |
| WO | 2011/093661 | A2 | 8/2011 |

OTHER PUBLICATIONS

International Search Report for PCT/KR2012/004365 mailed Jan. 2, 2013.
International Search Report for PCT/KR2012/008400 mailed Mar. 4, 2013.
International Search Report for PCT/KR2012/008401 mailed Feb. 28, 2013.
Search report from European Application No. 12 84 4371, dated Mar. 16, 2015.
International Search Report for PCT/KR2012/008397 mailed Mar. 29, 2013.
International Search Report for PCT/KR2012/008823 mailed on Feb. 28, 2013.
Machine translation of JP 2008-047398, retrieved from <https://www.j-platpat.inpit.go.jp/web/all/top/BTmTopEnglishPage> on May 22, 2015.

CABLE-TYPE SECONDARY BATTERY

CROSS-REFERENCE TO RELATED APPLICATION

This application is a continuation of U.S. patent application Ser. No. 14/188,795, filed on Feb. 25, 2014, which is a continuation of International Application No. PCT/KR2012/008397 filed on Oct. 15, 2012, which claims priority under 35 USC 119(a) to Korean Patent Application No. 10-2011-0104873 filed in the Republic of Korea on Oct. 13, 2011 and Korean Patent Application No. 10-2012-0114104 filed in the Republic of Korea on Oct. 15, 2012, the disclosures of which are incorporated herein by reference.

TECHNICAL FIELD

The present invention relates to a cable-type secondary battery, which can freely change in shape, and more particularly to a cable-type secondary battery having a core for supplying lithium ions.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent Application publication No. 2005-99903 discloses a flexible battery consisting of an inner electrode, an outer electrode and an electrolyte layer interposed therebetween. However, such battery has poor flexibility. The linear batteries use a polymer electrolyte to form an electrolyte layer, but this causes difficulties in the inflow of the electrolyte into an electrode active material, thereby increasing the resistance of the batteries and deteriorating the capacity and cycle characteristics thereof.

DISCLOSURE

Technical Problem

The present invention is designed to solve the problems of the prior art, and therefore it is an object of the present invention to provide a secondary battery having a new linear structure, which can easily change in shape, maintain excellent stability and performances as a secondary battery, and facilitate the inflow of an electrolyte into an electrode active material.

Technical Solution

In order to achieve the objects, the present invention provides a cable-type secondary battery having a horizontal cross section of a predetermined shape and extending longitudinally, comprising: a core for supplying lithium ions, which comprises an electrolyte; an inner electrode, comprising an open-structured inner current collector surrounding the outer surface of the core for supplying lithium ions, an inner electrode active material layer formed on the surface of the inner current collector, and an electrolyte-absorbing layer formed on the outer surface of the inner electrode active material layer; a separation layer surrounding the outer surface of the inner electrode to prevent a short circuit between electrodes; and an outer electrode surrounding the outer surface of the separation layer and comprising an outer electrode active material layer and an outer current collector.

Also, the present invention provides a cable-type secondary battery having a horizontal cross section of a predetermined shape and extending longitudinally, comprising: a core for supplying lithium ions, which comprises an electrolyte; an inner electrode, comprising an open-structured inner current collector surrounding the outer surface of the core for supplying lithium ions, an inner electrode active material layer formed on the surface of the inner current collector, and an electrolyte-absorbing layer formed on the outer surface of the inner electrode active material layer; and an outer electrode surrounding the outer surface of the inner electrode and comprising an outer electrode active material layer and an outer current collector.

The open-structured inner current collector is preferably in the form of a wound wire or a mesh, but is not particularly limited thereto.

In the outer electrode of the cable-type secondary battery having the separation layer, the outer electrode active material layer may be formed to surround the outer surface of the separation layer, and the outer current collector may be formed to surround the outer surface of the outer electrode active material layer; the outer current collector may be formed to surround the outer surface of the separation layer, and the outer electrode active material layer may be formed to surround the outer surface of the outer current collector; the outer current collector may be formed to surround the outer surface of the separation layer, and the outer electrode active material layer may be formed to surround the outer surface of the outer current collector and come into contact with the separation layer; or the outer electrode active material layer may be formed to surround the outer surface of the separation layer, and the outer current collector may be formed to be included inside the outer electrode active material layer by being covered therein and to surround the outer surface of the separation layer with spacing apart therefrom.

Also, in the outer electrode of the cable-type secondary battery having no separation layer, the outer electrode active material layer may be formed to surround the outer surface of the electrolyte-absorbing layer, and the outer current collector may be formed to surround the outer surface of the outer electrode active material layer; the outer current collector may be formed to surround the outer surface of the electrolyte-absorbing layer, and the outer electrode active material layer may be formed to surround the outer surface of the outer current collector; the outer current collector may be formed to surround the outer surface of the electrolyte-absorbing layer, and the outer electrode active material layer may be formed to surround the outer surface of the outer current collector and come into contact with the absorbing layer; or the outer electrode active material layer may be formed to surround the outer surface of the electrolyte-absorbing layer, and the outer current collector may be formed to be included inside the outer electrode active material layer by being covered therein and to surround the outer surface of the electrolyte-absorbing layer with spacing apart therefrom.

In the present invention, the outer current collector is not particularly limited to its forms, but is preferably in the form of a pipe, a wound wire, a wound sheet or a mesh.

The inner current collector is not particularly limited to its kinds, but is made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

Examples of the conductive material which may be used in the present invention include polyacetylene, polyaniline, polypyrrole, polythiophene, polysulfurnitride, indium tin oxide (ITO), silver, palladium, nickel, and mixtures thereof.

The outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

In the present invention, the core for supplying lithium ions comprises an electrolyte, and examples of the electrolyte may include, but are not particularly limited to, a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HEP, PMMA, PAN, or PVAc; and a solid electrolyte using PEO, polypropylene oxide (PPO), polyether imine (PEI), polyethylene sulphide (PES), or polyvinyl acetate (PVAc). The electrolyte further comprises a lithium salt, and the preferred examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and mixtures thereof.

The electrolyte-absorbing layer may be made of a polymer selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc), but is not particularly limited to thereto, and also, the electrolyte-absorbing layer may further comprise a lithium salt.

In the present invention, the inner electrode may be an anode and the outer electrode may be a cathode, or the inner electrode may be a cathode and the outer electrode may be an anode.

When the inner electrode of the present invention is an anode and the outer electrode is a cathode, the inner electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, and the outer electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x<0.5$, $0 \leq y<0.5$, $0 \leq z<0.5$, and $x+y+z \leq 1$), and mixtures thereof.

Alternatively, when the inner electrode is a cathode and the outer electrode is an anode, the inner electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x<0.5$, $0 \leq y<0.5$, $0 \leq z<0.5$, and $x+y+z \leq 1$), and mixtures thereof, and the outer electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, but the present invention is not particularly limited thereto.

In the present invention, the separation layer may be an electrolyte layer or a separator.

The electrolyte layer is not particularly limited to its kinds, but preferably is made of an electrolyte selected from a gel polymer electrolyte using PEO, PVdF, PVdF-HFP, PMMA, PAN, or PVAc; and a solid electrolyte of PEO, polypropylene oxide (PPO), polyether imine (PEI), polyethylene sulphide (PES), or polyvinyl acetate (PVAc). Also, the electrolyte layer may further comprise a lithium salt, and non-limiting examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and mixtures thereof.

When the separation layer is a separator, the cable-type secondary battery of the present invention needs an electrolyte solution, and examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Further, the present invention provides a cable-type secondary battery having multiple inner electrodes, and also a cable-type secondary battery having multiple inner electrodes with a separation layer.

Advantageous Effects

In accordance with the present invention, a core for supplying lithium ions, which comprises an electrolyte, is disposed in the inner electrode having an open structure, from which the electrolyte of the core for supplying lithium ions can be easily penetrated into an electrode active material, thereby facilitating the supply and exchange of lithium ions. Also, the inner electrode of the present invention has an electrolyte-absorbing layer on the outer surface thereof, from which the electrolyte of the core for supplying lithium ions can be contained in the inner electrode, thereby assisting the supply and exchange of lithium ions. Accordingly, the cable-type secondary battery of the present invention has such a core for supplying lithium ions to exhibit superior capacity and cycle characteristics. Also, the cable-type secondary battery of the present invention has an inner electrode having an open structure to exhibit good flexibility.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Figure 1:
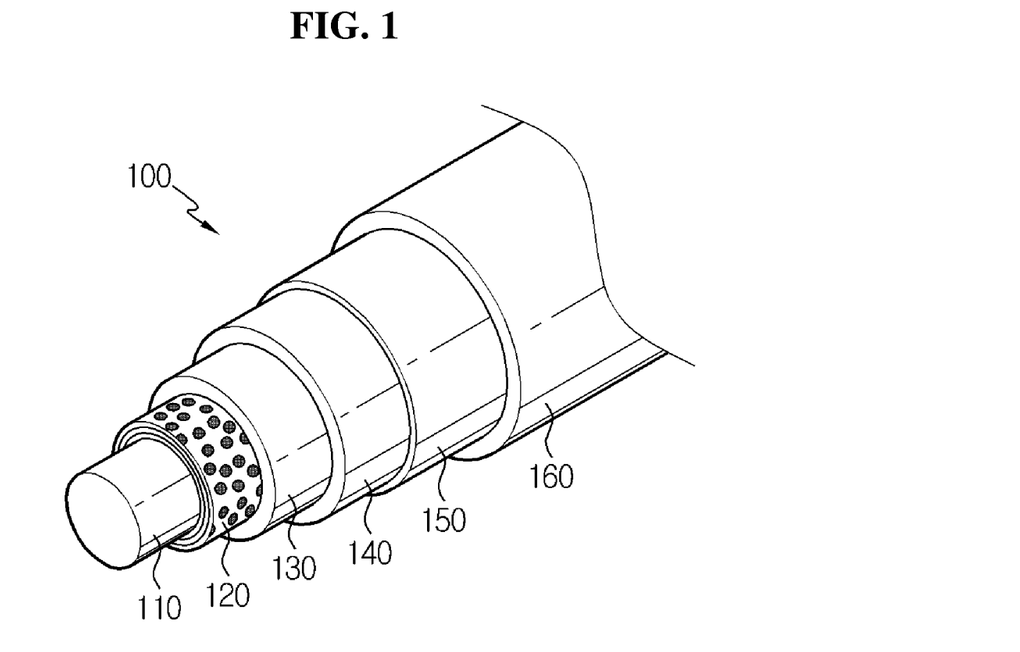
FIG. 1 is a perspective view showing a cable-type secondary battery having one inner electrode in the form of a mesh and a separation layer in accordance with one embodiment of the present invention.

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. FIG. 1 schematically shows a cable-type secondary battery having one inner electrode in the form of a mesh and a separation layer in accordance with one embodiment of the present invention. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Referring to FIG. 1, a cable-type secondary battery 100 has a horizontal cross section of a predetermined shape and extending longitudinally, and comprises a core 110 for supplying lithium ions, which comprises an electrolyte; an inner electrode 120, comprising an open-structured inner current collector surrounding the outer surface of the core for supplying lithium ions, an inner electrode active material layer formed on the surface of the inner current collector, and an electrolyte-absorbing layer formed on the outer surface of the inner electrode active material layer; a separation layer 130 surrounding the outer surface of the inner electrode to prevent a short circuit between electrodes; and an outer electrode surrounding the outer surface of the separation layer and comprising an outer electrode active material layer and an outer current collector.

In the present invention, the outer electrode may be formed in various embodiments depending on the disposition of the outer electrode active material layer and the outer current collector, which come into contact with the separation layer.

In FIG. 1, the outer electrode comprises an outer electrode active material layer 140 surrounding the outer surface of the separation layer 130 and an outer current collector 150 surrounding the outer surface of the outer electrode active material layer.

Also, the outer electrode of the cable-type secondary battery according to one embodiment of the present invention may be formed in a structure having the outer current collector formed to surround the outer surface of the separation layer, and the outer electrode active material layer formed to surround the outer surface of the outer current collector; a structure having the outer current collector formed to surround the outer surface of the separation layer, and the outer electrode active material layer formed to surround the outer surface of the outer current collector and to come into contact with the separation layer; or a structure having the outer electrode active material layer formed to surround the outer surface of the separation layer, and the outer current collector formed to be included inside the outer electrode active material layer by being covered therein and to surround the outer surface of the separation layer with spacing apart therefrom.

The term 'a predetermined shape' used herein refers to not being particularly limited to any shape, and means that any shape that does not damage the nature of the present invention is possible. The cable-type secondary battery of the present invention has a horizontal cross section of a predetermined shape, a linear structure, which extends in the longitudinal direction, and flexibility, so it can freely change in shape. Also, the term 'open-structured' used herein means that a structure has an open boundary surface through which a substance may be transferred freely from the inside of the structure to the outside thereof.

The conventional cable-type secondary batteries have an electrolyte layer which is interposed between an inner electrode and an outer electrode. In order for the electrolyte layer to isolate the inner electrode from the outer electrode and prevent a short circuit, the electrolyte layer is required to be made of gel-type polymer electrolytes or solid polymer electrolytes having a certain degree of mechanical properties. However, such gel-type polymer electrolytes or solid polymer electrolytes fail to provide superior performances as a source for lithium ions, so an electrolyte layer made of such should have an increased thickness so as to sufficiently provide lithium ions. Such a thickness increase in the electrolyte layer widens an interval between the electrodes to cause resistance increase, thereby deteriorating battery performances. In contrast, as the cable-type secondary battery 100 of the present invention has the core 110 for supplying lithium ions, which comprises an electrolyte, and the inner electrode 120 of the present invention has the open-structured inner current collector, the electrolyte of the core 110 for supplying lithium ions can pass through the inner current collector of the inner electrode 120 to reach the inner electrode active material layer and the outer electrode active material layer 140. Accordingly, it is not necessary to excessively increase the thickness of an electrolyte layer. Also, an electrolyte layer may not be adopted as an essential component, and therefore, only a separator may be optionally used. Thus, the cable-type secondary battery of the present invention has the core 110 for supplying lithium ions, which comprises an electrolyte, to facilitate the penetration of an electrolyte into an electrode active material, and eventually facilitate the supply and exchange of lithium ions in electrodes, thereby exhibiting superior capacity and cycle characteristics.

Figure 3:
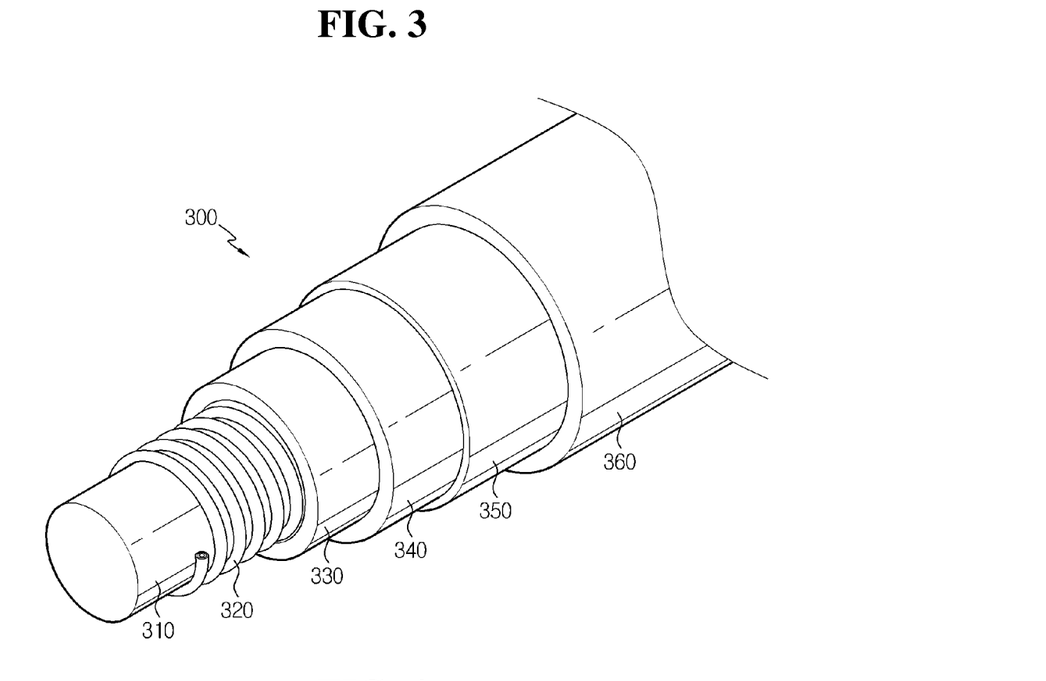
FIG. 3 is a perspective view showing a cable-type secondary battery having one inner electrode in the form of a wound wire and a separation layer in accordance with one embodiment of the present invention.

The inner electrode 120 of the present invention maintains its open structure by forming the inner electrode active material layer by way of coating on the surface of the open-structured inner current collector, in which the electrolyte-absorbing layer is also formed on the surface of the inner electrode active material layer. The electrolyte-absorbing layer may contain the electrolyte of the core 110 for supplying lithium ions, and also comprise a lithium salt, to facilitate the supply and exchange of lithium ions in electrodes, thereby providing superior capacity and cycle characteristics to the battery. This inner electrode 120 has the open-structured inner current collector, which allows the penetration of the electrolyte comprised in the core 110 for supplying lithium ions, and the open structure form may be any form if it facilitates the penetration of the electrolyte. Referring to FIGS. 1 and 3, as a non-limiting example of the open-structured inner current collector, an inner electrode 320 applying a wound wire-type inner current collector, and an inner electrode 120 applying a mesh-form inner current collector are illustrated.

The core 110 for supplying lithium ions comprises an electrolyte, and examples of the electrolyte may include, but are not particularly limited to, a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HEP, PMMA, PAN, or PVAc; and a solid electrolyte using PEO, polypropylene oxide (PPO), polyether imine (PEI), polyethylene sulphide (PES), or polyvinyl acetate (PVAc). The electrolyte further comprises a lithium salt, and the preferred examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and the like. Also, the core 110 for supplying lithium ions may consist of only an electrolyte, and in the case of a liquid electrolyte, a porous carrier may be used together.

The inner current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

In the present invention, the inner electrode active material layer is formed on the surface of the inner current collector which preferably maintains an open structure form. On the surface of the inner electrode active material layer, the electrolyte-absorbing layer is formed. The electrolyte-absorbing layer may comprise a polymer selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc), but is not particularly limited thereto. Also, the electrolyte-absorbing layer may further comprise a lithium salt, and the preferred examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and the like.

In the present invention, the outer current collector is not particularly limited to its forms, but is preferably in the form of a pipe, a wound wire, a wound sheet or a mesh. The outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

The inner electrode may be an anode and the outer electrode may be a cathode. Alternatively, the inner electrode may be a cathode and the outer electrode may be an anode.

In the present invention, the electrode active material layer allows ions to move through the current collector, and the movement of ions is caused by the interaction of ions such as intercalation/deintercalation of ions into and from the electrolyte layer. Such an electrode active material layer may be divided into an anode active material layer and a cathode active material layer.

Specifically, when the inner electrode is an anode and the outer electrode is a cathode, the inner electrode active material layer becomes an anode active material layer and may be made of an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, and the outer electrode active material layer becomes a cathode active material layer and may be made of an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and mixtures thereof.

Alternatively, when the inner electrode is a cathode and the outer electrode is an anode, the inner electrode active material layer becomes a cathode active material layer and the outer electrode active material layer becomes an anode active material layer.

As mentioned above, referring to FIG. 1, the outer electrode comprises an outer electrode active material layer 140 surrounding the outer surface of the separation layer 130 and an outer current collector 150 surrounding the outer surface of the outer electrode active material layer 140.

Also, the outer electrode may have the outer current collector formed to surround the outer surface of the separation layer, and the outer electrode active material layer formed to surround the outer surface of the outer current collector; may have the outer current collector formed to surround the outer surface of the separation layer, and the outer electrode active material layer formed to surround the outer surface of the outer current collector and to come into contact with the separation layer; or may have the outer electrode active material layer formed to surround the outer surface of the separation layer, and the outer current collector formed to be included inside the outer electrode active material layer by being covered therein and to surround the outer surface of the separation layer with spacing apart therefrom.

Specifically, if the outer current collector is wound on the outer surface of the separation layer, a contact area of the separation layer and the active material layer sufficiently increases to ensure a certain degree of battery performances. Particularly, since the outer electrode active material layer of the present invention is formed by coating an active material in the form of a slurry on the outer surface of the outer current collector, the outer electrode active material layer comes into contact with the separation layer. Also, the outer current collector is included inside the outer electrode active material layer by being covered therein, while surrounding the outer surface of the separation layer with spacing apart therefrom by the outer electrode active material layer. As a result, an electric contact between the outer current collector and the outer electrode active material layer is improved, thereby contributing to the enhancement of battery characteristics.

For example, when the outer current collector is in the form of a wound wire having flexibility, the wound wire-form outer current collector has elasticity due to its form to enhance the overall flexibility of the cable-type secondary battery. Also, when excessive external force is applied to the cable-type secondary battery of the present invention, the wire-form outer current collector of the present invention undergoes very little excessive deformation such as crumpling or bending, so a short circuit due to a contact with an inner current collector may be avoided.

The electrode active material layer comprises an electrode active material, a binder and a conductive material, and is combined with a current collector to configure an electrode. If the electrode is deformed by bending or severely folding due to external force, the electrode active material may be released. The release of the electrode active material deteriorates the performance and capacity of batteries. However, in accordance with the present invention, the wound wire-form outer current collector having elasticity functions to disperse the applied force when such a deformation occurs by the external force, from which the active material layer is less deformed, thereby preventing the release of the active material. The separation layer of the present invention may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of the typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve the poor mechanical properties. The electrolyte layer of the present invention can serve as a separator, and thus an additional separator may be omitted.

The electrolyte layer of the present invention may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer. Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes.

Also, the cable-type secondary battery of the present invention has a protection coating. The protection coating is an insulator and is formed to surround the outer current collector, thereby protecting the electrodes against moisture in the air and external impacts. The protection coating may be made of conventional polymer resins, for example, PVC, HDPE or epoxy resins.

Also, the cable-type secondary battery of the present invention may not have the separation layer.

Figure 2:
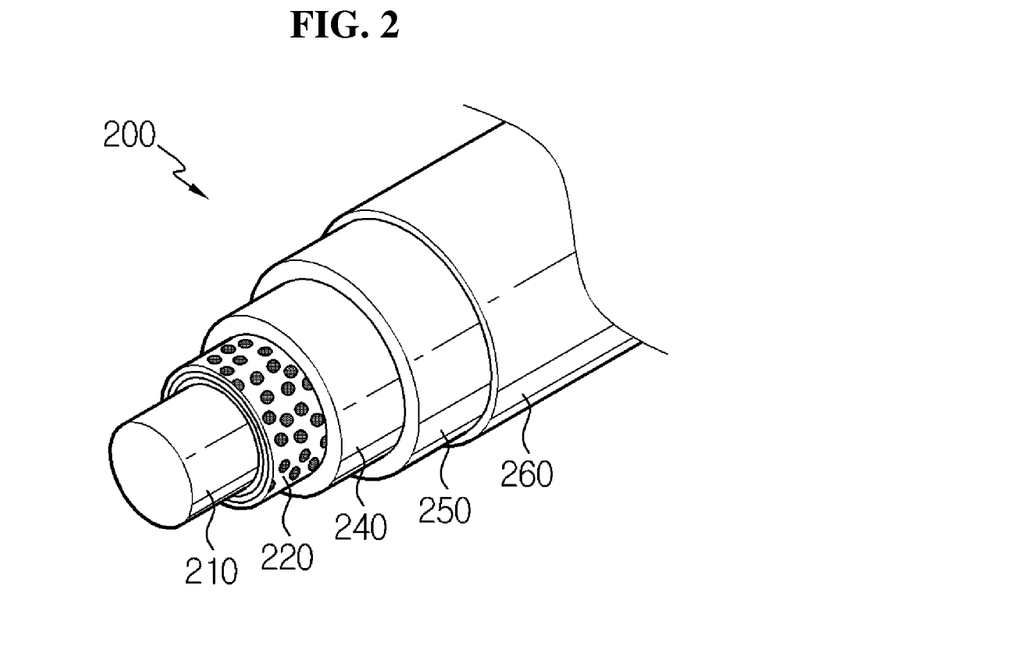
FIG. 2 is a perspective view showing a cable-type secondary battery having one inner electrode in the form of a mesh in accordance with one embodiment of the present invention.

Referring to FIG. 2, a cable-type secondary battery 200 according to one embodiment of the present invention comprises a core 210 for supplying lithium ions, which comprises an electrolyte; an inner electrode 220, comprising an open-structured inner current collector surrounding the outer surface of the core for supplying lithium ions, an inner electrode active material layer formed on the surface of the inner current collector, and an electrolyte-absorbing layer formed on the outer surface of the inner electrode active material layer; and an outer electrode comprising an outer electrode active material layer 240 surrounding the outer surface of the inner electrode and an outer current collector 250 surrounding the outer surface of the outer electrode active material layer 240. The inner electrode 220 of the present invention has the electrolyte-absorbing layer on the outermost surface thereof, thereby preventing a short circuit between the inner electrode and the outer electrode. Accordingly, the separation layer may not be essential.

Also, the outer electrode may have the outer current collector formed to surround the outer surface of the electrolyte-absorbing layer, and the outer electrode active material layer formed to surround the outer surface of the outer current collector; may have the outer current collector formed to surround the outer surface of the electrolyte-absorbing layer, and the outer electrode active material layer formed to surround the outer surface of the outer current collector and to come into contact with the electrolyte-absorbing layer; or may have the outer electrode active material layer formed to surround the outer surface of the electrolyte-absorbing layer, and the outer current collector formed to be included inside the outer electrode active material layer by being covered therein and to surround the outer surface of the electrolyte-absorbing layer with spacing apart therefrom.

Specifically, if the outer current collector is wound on the outer surface of the electrolyte-absorbing layer, similar to the case that the outer current collector is wound on the outer surface of the separation layer, a contact area of the electrolyte-absorbing layer and the active material layer sufficiently increases to ensure a certain degree of battery performances. Particularly, since the outer electrode active material layer of the present invention is formed by coating an active material in the form of a slurry on the outer surface of the outer current collector, the outer electrode active material layer comes into contact with the electrolyte-absorbing layer. Also, the outer current collector is included inside the outer electrode active material layer by being covered therein, while surrounding the outer surface of the electrolyte-absorbing layer with spacing apart therefrom by the outer electrode active material layer. As a result, an electric contact between the outer current collector and the outer electrode active material layer is improved, thereby contributing to the enhancement of battery characteristics.

Hereinafter, a cable-type secondary battery according to one embodiment of the present invention and the manufacture thereof will be briefly explained with reference to FIG. 1.

A cable-type secondary battery 100 according to one embodiment of the present invention comprises a core 110 for supplying lithium ions, which comprises an electrolyte; an inner electrode 120, comprising a mesh-form inner current collector surrounding the outer surface of the core for supplying lithium ions, an inner electrode active material layer formed on the surface of the inner current collector, and an electrolyte-absorbing layer formed on the outer surface of the inner electrode active material layer; a separation layer 130 surrounding the outer surface of the inner electrode to prevent a short circuit between electrodes; and an outer electrode comprising an outer electrode active material layer 140 surrounding the outer surface of the separation layer and an outer current collector 150 surrounding the outer surface of the outer electrode active material layer.

First, a polymer electrolyte is provided in the form of a wire using an extruder to prepare the core 110 for supplying lithium ions. Also, the core 110 for supplying lithium ions may be formed by providing a hollow inner electrode and introducing a non-aqueous electrolyte solution in the center of the inner electrode, or may be formed by providing a battery assembly comprising a protection coating as well as the others and introducing a non-aqueous electrolyte solution in the center of the inner electrode support comprised in the battery assembly. Alternatively, the core 110 for supplying lithium ions may be prepared by providing a wire-form carrier made of a sponge material and introducing a non-aqueous electrolyte solution thereto.

Then, a mesh-form inner current collector is provided, and an inner electrode active material layer is formed by way of coating on the surface of the mesh-form inner current collector. The coating may be carried out by various conventional methods, for example, by an electroplating process or an anodic oxidation process. Also, in order to maintain constant intervals, an electrode slurry containing an active material may be discontinuously applied by way of an extrusion-coating using an extruder. In addition, the electrode slurry containing an active material may be applied by way of dip coating or extrusion-coating using an extruder.

On the surface of the inner electrode active material layer formed by way of coating, an electrolyte-absorbing layer is formed by way of dip coating or extrusion-coating using an extruder, to prepare the inner electrode 120. The inner electrode 120 thus prepared is applied on the outer surface of the core 110 for supplying lithium ions.

Subsequently, the separation layer 130 made of a nonwoven fabric is formed to surround the inner electrode 120.

On the outer surface of the separation layer 130 formed by the coating of an electrolyte, the outer electrode active material layer 140 is formed by way of coating. The coating method of the inner electrode active material layer may be identically applied to the outer electrode active material layer 140.

Then, an outer current collector in the form of a wire is provided and wound on the outer surface of the outer electrode active material layer 140 to form the wound wire-form outer current collector. As the outer current collector, a wound sheet-, pipe- or mesh-form current collector may be used. At this time, the outer electrode active material layer may be first formed on the outer current collector and then the separation layer is applied thereon, to form the outer electrode. For example, in the case of the wound sheet-form current collector, the outer electrode active material layer may be first formed on the wound sheet-form current collector, followed by cutting into a piece having a predetermined size, to prepare a sheet-form outer electrode. Then, the prepared sheet-form outer electrode may be wound on the outer surface of the separation layer so that the outer electrode active material layer comes into contact with the separation layer, to form the outer electrode on the separation layer.

As another method, in the formation of the outer electrode, the outer current collector may be first formed to surround the outer surface of the separation layer, and then followed by forming the outer electrode active material layer to surround the outer surface of the outer current collector.

Meanwhile, in the case of a structure having the outer current collector formed to surround the outer surface of the separation layer, and the outer electrode active material layer formed to surround the outer surface of the outer current collector and to come into contact with the separation layer, first, an outer current collector, for example, in the form of a wire or sheet, is wound on the outer surface of the separation layer. The winding method is not particularly limited. For example, in the case of the wire-form current collector, the winding may be carried out by using a winding machine on the outer surface of the separation layer. Then, the outer electrode active material layer is formed by way of coating on the outer surface of the wound wire- or sheet-form outer current collector so that the outer electrode active material layer surrounds the outer current collector and comes into contact with the separation layer.

Also, in the case of a structure having the outer electrode active material layer formed to surround the outer surface of the separation layer, and the outer current collector formed to be included inside the outer electrode active material layer by being covered therein and to surround the outer surface of the separation layer with spacing apart therefrom, first, on the outer surface of the separation layer, a part of the outer electrode active material layer to be finally obtained is formed, on which the outer current collector is formed to surround the part of the outer electrode active material layer, and then the outer electrode active material layer is further formed on the outer current collector to completely cover the outer current collector. Thereby, the outer current collector is disposed inside the outer electrode active material layer to improve an electric contact between the current collector and the active material, thereby enhancing battery characteristics.

Finally, the protection coating 160 is formed to surround the outer surface of the electrode assembly. The protection coating 160 is an insulator and is formed on the outermost surface for the purpose of protecting the electrodes against moisture in the air and external impacts. As the protection coating 160, conventional polymer resins, for example, PVC, HDPE and epoxy resins may be used.

Hereinafter, other embodiments of the present invention will be briefly explained with reference to FIGS. 2, 3 and 4.

Referring to FIG. 2, a cable-type secondary battery 200 according to one embodiment of the present invention comprises a core 210 for supplying lithium ions, which comprises an electrolyte; an inner electrode 220, comprising a mesh-form inner current collector surrounding the outer surface of the core for supplying lithium ions, an inner electrode active material layer formed on the surface of the inner current collector, and an electrolyte-absorbing layer formed on the outer surface of the inner electrode active material layer; and an outer electrode comprising an outer electrode active material layer 240 surrounding the outer surface of the inner electrode and an outer current collector 250 surrounding the outer surface of the outer electrode active material layer. Such a cable-type secondary battery 200 does not comprise the separation layer 130, unlike the cable-type secondary battery 100 of FIG. 1.

Referring to FIG. 3, a cable-type secondary battery 300 according to one embodiment of the present invention comprises a core 310 for supplying lithium ions, which comprises an electrolyte; an inner electrode 320, comprising a wound wire-form inner current collector surrounding the outer surface of the core for supplying lithium ions, an inner electrode active material layer formed on the surface of the inner current collector, and an electrolyte-absorbing layer formed on the outer surface of the inner electrode active material layer; a separation layer 330 surrounding the outer surface of the inner electrode to prevent a short circuit between electrodes; and an outer electrode comprising an outer electrode active material layer 340 surrounding the outer surface of the separation layer and an outer current collector 350 surrounding the outer surface of the outer electrode active material layer.

Figure 4:
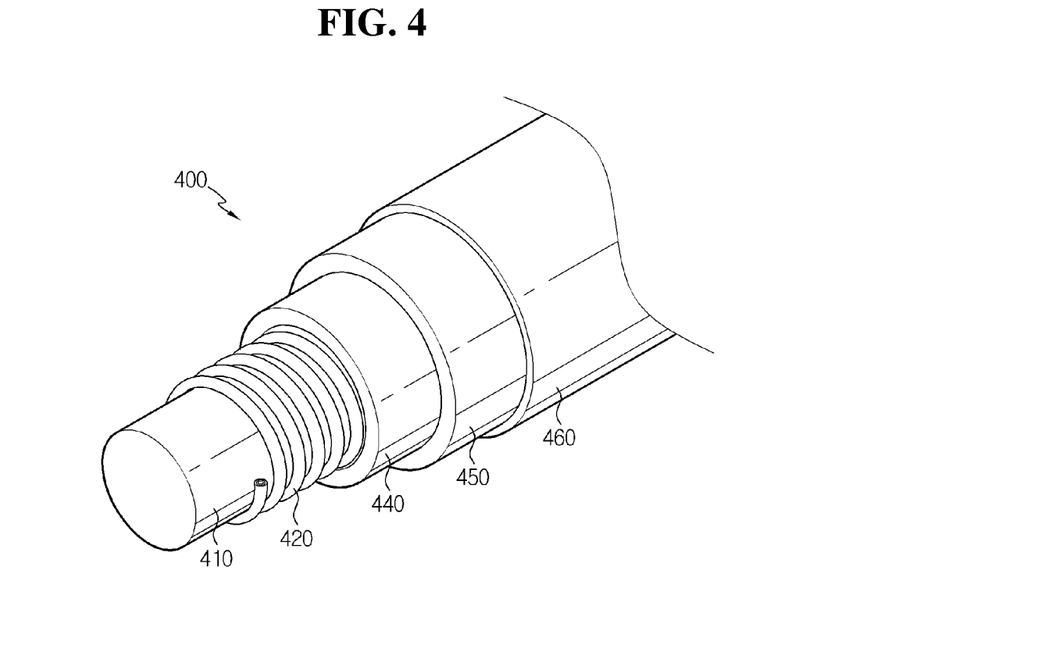
FIG. 4 is a perspective view showing a cable-type secondary battery having one inner electrode in the form of a wound wire in accordance with one embodiment of the present invention.

Referring to FIG. 4, a cable-type secondary battery 400 according to one embodiment of the present invention comprises a core 410 for supplying lithium ions, which comprises an electrolyte; an inner electrode 420, comprising a wound wire-form inner current collector surrounding the outer surface of the core for supplying lithium ions, an inner electrode active material layer formed on the surface of the inner current collector, and an electrolyte-absorbing layer formed on the outer surface of the inner electrode active material layer; and an outer electrode comprising an outer electrode active material layer 440 surrounding the outer surface of the inner electrode and an outer current collector 450 surrounding the outer surface of the outer electrode active material layer. Such a cable-type secondary battery 400 does not comprise the separation layer 330, unlike the cable-type secondary battery 300 of FIG. 3.

Hereinafter, still other embodiments of the present invention will be briefly explained with reference to FIGS. 5 and 6.

Figure 5:
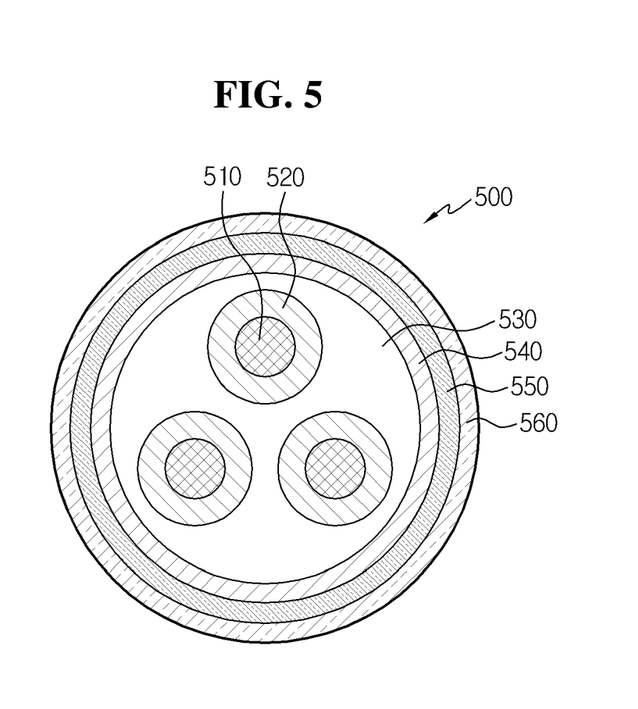
FIG. 5 is a perspective view showing a cable-type secondary battery having multiple inner electrodes and a separation layer in accordance with one embodiment of the present invention.

Referring to FIG. 5, a cable-type secondary battery 500 according to one embodiment of the present invention comprises two or more cores 510 for supplying lithium ions, which comprise an electrolyte; two or more inner electrodes 520 arranged parallel to each other, each inner electrode comprising an open-structured inner current collector surrounding the outer surface of each core for supplying lithium ions, an inner electrode active material layer formed on the surface of the inner current collector, and an electrolyte-absorbing layer formed on the outer surface of the inner electrode active material layer; a separation layer 530 surrounding the outer surface of the inner electrodes 520 to prevent a short circuit between electrodes; and an outer electrode comprising an outer electrode active material layer 540 surrounding the outer surface of the separation layer 530 and an outer current collector 550 surrounding the outer surface of the outer electrode active material layer 540. Such a cable-type secondary battery 500 has the inner electrode consisting of multiple electrodes, thereby allowing to control the balance between a cathode and anode and prevent a short circuit.

Figure 6:
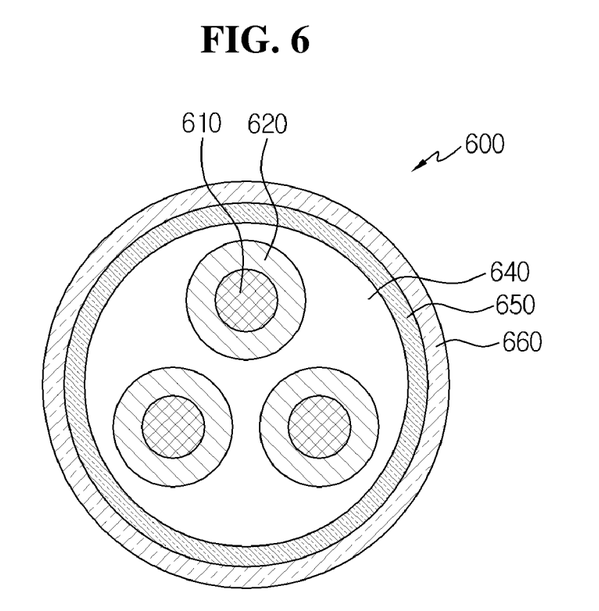
FIG. 6 is a cross-sectional view showing a cable-type secondary battery having multiple inner electrodes in accordance with one embodiment of the present invention.

Referring to FIG. 6, a cable-type secondary battery 600 according to one embodiment of the present invention comprises two or more cores 610 for supplying lithium ions, which comprise an electrolyte; two or more inner electrodes 620 arranged parallel to each other, each inner electrode comprising an open-structured inner current collector surrounding the outer surface of each core for supplying lithium ions, an inner electrode active material layer formed on the surface of the inner current collector, and an electrolyte-absorbing layer formed on the outer surface of the inner electrode active material layer; and an outer electrode comprising an outer electrode active material layer 640 surrounding the outer surface of the inner electrode and an outer current collector 650 surrounding the outer surface of the outer electrode active material layer 640. Such a cable-type secondary battery 600 does not comprise the separation layer 530, unlike the cable-type secondary battery 500 of FIG. 5.

Also, in the cable-type secondary battery of FIG. 3 and the cable-type secondary battery having the inner electrode consisting of multiple electrodes of FIG. 5, besides the structure of the outer electrode having the outer electrode active material layer formed to surround the outer surface of the separation layer, and the outer current collector formed to surround the outer surface of the outer electrode active material layer, as mentioned above, the outer electrode may be formed in a structure having the outer current collector formed to surround the outer surface of the separation layer, and the outer electrode active material layer formed to surround the outer surface of the outer current collector; a structure having the outer current collector formed to surround the outer surface of the separation layer, and the outer electrode active material layer formed to surround the outer surface of the outer current collector and to come into contact with the separation layer; or a structure having the outer electrode active material layer formed to surround the outer surface of the separation layer, and the outer current collector formed to be included inside the outer electrode active material layer by being covered therein and to surround the outer surface of the separation layer with spacing apart therefrom.

Meanwhile, in the cable-type secondary battery of FIG. 4 and the cable-type secondary battery having the inner electrode consisting of multiple electrodes of FIG. 6, since the separation layer is not used, the outer electrode is formed on the outer surface of the electrolyte-absorbing layer.

In this case, besides the structure having the outer electrode active material layer formed to surround the outer surface of the electrolyte-absorbing layer, and the outer current collector formed to surround the outer surface of the outer electrode active material layer, as mentioned above, the outer electrode may be formed in a structure having the outer current collector formed to surround the outer surface of the electrolyte-absorbing layer, and the outer electrode active material layer formed to surround the outer surface of the outer current collector; a structure having the outer current collector formed to surround the outer surface of the electrolyte-absorbing layer, and the outer electrode active material layer formed to surround the outer surface of the outer current collector and come into contact with the absorbing layer; or a structure having the outer electrode active material layer formed to surround the outer surface of the electrolyte-absorbing layer, and the outer current collector formed to be included inside the outer electrode active material layer by being covered therein and to surround the outer surface of the electrolyte-absorbing layer with spacing apart therefrom.

EXPLANATION OF REFERENCE NUMERALS 100, 200, 300, 400, 500, 600: Cable-type Secondary Battery
110, 210, 310, 410, 510, 610: Core for Supplying Lithium Ions
120, 220, 320, 420, 520, 620: Inner Electrode
130, 330, 530: Separation Layer
140, 240, 340, 440, 540, 640: Outer Electrode Active Material Layer
150, 250, 350, 450, 550, 650: Outer Current Collector
160, 260, 360, 460, 560, 660: Protection Coating.

What is claimed is:

1. A cable-type secondary battery comprising:
a core including an electrolyte for supplying lithium ions;
an inner electrode, comprising an inner current collector surrounding the core for supplying lithium ions, an inner electrode active material layer formed on a surface of the inner current collector, and an electrolyte-absorbing layer formed on an outer surface of the inner electrode active material layer;
a separation layer surrounding an outer surface of the inner electrode to prevent a short circuit between electrodes; and
an outer electrode surrounding an outer surface of the separation layer and comprising an outer electrode active material layer and an outer current collector.

2. A cable-type secondary battery comprising:
a core including an electrolyte for supplying lithium ions;
an inner electrode, comprising an inner current collector surrounding the core for supplying lithium ions, an inner electrode active material layer formed on a surface of the inner current collector, and an electrolyte-absorbing layer formed on an outer surface of the inner electrode active material layer; and
an outer electrode surrounding an outer surface of the inner electrode and comprising an outer electrode active material layer and an outer current collector.

3. The cable-type secondary battery according to claim 1, wherein the inner current collector is an open-structured inner current collector.

4. The cable-type secondary battery according to claim 3, wherein the open-structured inner current collector is in the form of a wound wire or a mesh.

5. The cable-type secondary battery according to claim 1, wherein in the outer electrode,
the outer electrode active material layer is formed to surround the outer surface of the separation layer, and the outer current collector is formed to surround an outer surface of the outer electrode active material layer;
the outer current collector is formed to surround the outer surface of the separation layer, and the outer electrode active material layer is formed to surround an outer surface of the outer current collector;
the outer current collector is formed to surround the outer surface of the separation layer, and the outer electrode active material layer is formed to surround the outer surface of the outer current collector and come into contact with the separation layer; or
the outer electrode active material layer is formed to surround the outer surface of the separation layer, and the outer current collector is formed to be included inside the outer electrode active material layer by being covered therein and to surround the outer surface of the separation layer with spacing apart therefrom.

6. The cable-type secondary battery according to claim 2, wherein in the outer electrode,
the outer electrode active material layer is formed to surround an outer surface of the electrolyte-absorbing layer, and the outer current collector is formed to surround an outer surface of the outer electrode active material layer;
the outer current collector is formed to surround the outer surface of the electrolyte-absorbing layer, and the outer electrode active material layer is formed to surround an outer surface of the outer current collector;
the outer current collector is formed to surround the outer surface of the electrolyte-absorbing layer, and the outer electrode active material layer is formed to surround the outer surface of the outer current collector and come into contact with the electrolyte-absorbing layer; or
the outer electrode active material layer is formed to surround the outer surface of the electrolyte-absorbing layer, and the outer current collector is formed to be included inside the outer electrode active material layer by being covered therein and to surround the outer surface of the electrolyte-absorbing layer with spacing apart therefrom.

7. The cable-type secondary battery according to claim 1, wherein the outer current collector is in the form of a pipe, a wound wire, a wound sheet or a mesh.

8. The cable-type secondary battery according to claim 1, wherein the inner current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; or a conductive polymer.

9. The cable-type secondary battery according to claim 8, wherein the conductive material is selected from the group consisting of polyacetylene, polyaniline, polypyrrole, polythiophene, polysulfurnitride, indium tin oxide (ITO), silver, palladium, nickel, and mixtures thereof.

10. The cable-type secondary battery according to claim 8, wherein the conductive polymer is selected from the group consisting of polyacetylene, polyaniline, polypyrrole, polythiophene, polysulfurnitride, and mixtures thereof.

11. The cable-type secondary battery according to claim 1, wherein the outer current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

12. The cable-type secondary battery according to claim 1, wherein the electrolyte comprises an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HEP, PMMA, PAN, or PVAc; and a solid electrolyte using PEO, polypropylene oxide (PPO), polyether imine (PEI), polyethylene sulphide (PES), or polyvinyl acetate (PVAc).

13. The cable-type secondary battery according to claim 1, wherein the electrolyte further comprises a lithium salt.

14. The cable-type secondary battery according to claim 13, wherein the lithium salt is selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and mixtures thereof.

15. The cable-type secondary battery according to claim 1, wherein the inner electrode is an anode and the outer electrode is a cathode, or the inner electrode is a cathode and the outer electrode is an anode.

16. The cable-type secondary battery according to claim 1, wherein when the inner electrode is an anode and the outer electrode is a cathode,
the inner electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, and
the outer electrode active material layer comprises an active material selected from the group consisting of LiCoO$_2$, LiNiO$_2$, LiMn$_2$O$_4$, LiCoPO$_4$, LiFePO$_4$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which 0≤x<0.5, 0≤y<0.5, 0≤z<0.5, and 0≤x+y+z≤1), and mixtures thereof.

17. The cable-type secondary battery according to claim 1, wherein the electrolyte-absorbing layer comprises a polymer selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

18. The cable-type secondary battery according to claim 1, wherein the electrolyte-absorbing layer further comprises a lithium salt.

19. The cable-type secondary battery according to claim 18, wherein the lithium salt is selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and mixtures thereof.

20. The cable-type secondary battery according to claim 1, wherein when the inner electrode is a cathode and the outer electrode is an anode,
the inner electrode active material layer comprises an active material selected from the group consisting of LiCoO$_2$, LiNiO$_2$, LiMn$_2$O$_4$, LiCoPO$_4$, LiFePO$_4$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which 0≤x<0.5, 0≤y<0.5, 0≤z<0.5, and 0≤x+y+z≤1), and mixtures thereof, and
the outer electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof.

21. The cable-type secondary battery according to claim 1, wherein the separation layer is an electrolyte layer or a separator.

22. The cable-type secondary battery according to claim 21, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

23. The cable-type secondary battery according to claim 21, wherein the electrolyte layer further comprises a lithium salt.

24. The cable-type secondary battery according to claim 23, wherein the lithium salt is selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and mixtures thereof.

25. The cable-type secondary battery according to claim 21, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

26. A cable-type secondary battery comprising:
    two or more cores each including an electrolyte and for supplying lithium ions;
    two or more inner electrodes arranged in parallel to each other, each inner electrode comprising an inner current collector surrounding an outer surface of a core of the two or more cores for supplying lithium ions, an inner electrode active material layer formed on a surface of the inner current collector, and an electrolyte-absorbing layer formed on an outer surface of the inner electrode active material layer;
    a separation layer surrounding respective outer surfaces of the inner electrodes to prevent a short circuit between electrodes; and
    an outer electrode surrounding an outer surface of the separation layer and comprising an outer electrode active material layer and an outer current collector.

27. A cable-type secondary battery comprising:
    two or more cores each including an electrolyte and for supplying lithium ions;
    two or more inner electrodes arranged in parallel to each other, each inner electrode comprising an inner current collector surrounding an outer surface of a core of the two or more cores for supplying lithium ions, an inner electrode active material layer formed on a surface of the inner current collector, and an electrolyte-absorbing layer formed on an outer surface of the inner electrode active material layer; and
    an outer electrode surrounding respective outer surfaces of the inner electrodes and comprising an outer electrode active material layer and an outer current collector.

28. The cable-type secondary battery according to claim 1, wherein the electrolyte is a liquid electrolyte and the core further includes a porous carrier.

29. The cable-type secondary battery according to claim 1, wherein the electrolyte is a gel-type polymer electrolyte and the core further includes a porous support or a cross-linked polymer.

30. The cable-type secondary battery according to claim 1, further comprising a protection coating surrounding the outer electrode.

31. The cable-type secondary battery according to claim 30, wherein the protection coating is comprised of a polymer resin.

* * * * *